(12) United States Patent
Westergren et al.

(10) Patent No.: US 7,416,778 B2
(45) Date of Patent: Aug. 26, 2008

(54) METHOD FOR HIGH SPEED MACHINING AND COATED CUTTING TOOL

(75) Inventors: Kenneth Westergren, Hägersten (SE); Marian Mikus, Skärholmen (SE); Leif Åkesson, Älvsjö (SE)

(73) Assignee: Sandvik Intellectual Property AB, Sandviken (SE)

( * ) Notice: Subject to any disclaimer, the term of this patent is extended or adjusted under 35 U.S.C. 154(b) by 310 days.

(21) Appl. No.: 11/240,635

(22) Filed: Oct. 3, 2005

(65) Prior Publication Data

US 2008/0070046 A1    Mar. 20, 2008

(30) Foreign Application Priority Data

Oct. 4, 2004   (SE) .................................. 0402386

(51) Int. Cl.
   *B32B 9/00*   (2006.01)
(52) U.S. Cl. .......................... 428/216; 51/307; 51/309; 428/336; 428/472; 428/698; 428/701
(58) Field of Classification Search ................ 428/698, 428/701, 216, 336, 472; 51/307, 309
   See application file for complete search history.

(56) References Cited

U.S. PATENT DOCUMENTS

| | | | | |
|---|---|---|---|---|
| 4,984,940 A | * | 1/1991 | Bryant et al. ............... | 428/698 |
| 5,693,417 A | * | 12/1997 | Goedicke et al. ............ | 428/701 |
| 5,700,569 A | * | 12/1997 | Ruppi ......................... | 51/307 |
| 6,183,846 B1 | | 2/2001 | Moriguchi et al. .......... | 428/216 |
| 6,333,099 B1 | * | 12/2001 | Strondl et al. ............... | 428/336 |
| 6,720,095 B2 | | 4/2004 | Ruppi et al. ................. | 428/698 |
| 6,733,874 B2 | | 5/2004 | Ueda et al. .................. | 428/216 |
| 6,805,944 B2 | * | 10/2004 | Oshika et al. ............... | 428/216 |

FOREIGN PATENT DOCUMENTS

| | | | |
|---|---|---|---|
| EP | 0 653 499 | | 5/1995 |
| EP | 0 675 212 | | 10/1995 |
| EP | 1 048 750 | | 11/2000 |
| GB | 2 048 960 | * | 4/1980 |
| SE | 0300781-2 | | 3/2003 |
| WO | 99/29920 | * | 6/1999 |

* cited by examiner

*Primary Examiner*—Archene Turner
(74) *Attorney, Agent, or Firm*—Drinker Biddle & Reath LLP

(57) ABSTRACT

The present invention relates to a method of machining a metal work piece with a coated cutting tool insert having a cemented carbide body and a coating deposited as monolayer (s) or as multiple and/or alternating layers. The coating has a total thickness of from about 25 to about 75 μm and the machining is performed at a cutting speed of greater than about 600 m/min, preferably from about 800 to about 1500 m/min. The invention also relates to a coated cutting tool useful for such machining operation.

5 Claims, 1 Drawing Sheet

METHOD FOR HIGH SPEED MACHINING AND COATED CUTTING TOOL

BACKGROUND OF THE INVENTION

The present invention relates to a method for high speed machining of metallic work pieces and a coated cemented carbide cutting inserts particularly useful for that application.

Cemented carbide cutting tools coated with various types of hard layers have been commercially available for years. Such tool coatings are generally built up by one Ti(C,N) hard layer and one $Al_2O_3$ hard layer where the Ti(C,N) is the innermost layer adjacent to the cemented carbide. The thickness of the individual layers is carefully chosen to suit different cutting applications and work-piece materials e g cast iron and stainless steel. More particularly, a coating generally comprises:

- a Ti-compound layer, as an inner layer, formed by CVD or MT-CVD with an average thickness of 2 to 10 µm made of one major Ti(C,N) layer or a plurality of two or more layers of TiC, TiN, Ti(C,N), Ti(C,O) and Ti(C,N,O)
- an $Al_2O_3$-layer, as an outer layer formed by CVD which has an average thickness of 2 to 10 µm and generally with the α- and/or κ type crystal structure;
- optionally, a TiN layer having an average thickness of 0.5 to 2 µm, as a surface layer, deposited on the upper layer for the purpose of identification of the cutting edges before and after cutting operations because of its golden color tone.

Such coated cemented carbide tool inserts may be used for both continuous and interrupted cutting operations of various types of steels and cast iron.

U.S. Pat. No. 6,733,874 discloses a cutting tool used for machining operations at cutting speed up to 420 m/min, having a hard coating including: a Ti compound layer, as a lower layer, formed by vapor deposition, having an average thickness of 0.5 to 20 µm and made of at least one layer chosen from TiC, TiN, Ti(C,N), Ti(C,O) and Ti(C,N,O); an aluminium oxide layer, as an intermediate layer, with an average thickness of 1 to 25 µm and a heat transformed α-type crystal structure derived from a vapor deposited κ- or θ-type aluminium oxide layer, and with a structure having cracks therein formed during heat transformation uniformly dispersed and an aluminium oxide layer, as an upper layer, formed by vapor deposition having an average thickness of 0.3 to 10 µm and an (α-type crystal structure.

U.S. Pat. No. 6,720,095 discloses a coated sintered cemented carbide body including a cemented carbide body, a first layer adjacent the cemented carbide body, the first layer including Ti(C,N) and having a thickness of from about 3 to about 20 µm, an alumina layer adjacent said first layer, the alumina layer including α-$Al_2O_3$ or κ-$Al_2O_3$ and having a thickness of from about 1 to about 15 µm, and a further layer adjacent the alumina layer of a carbide, carbonitride or carboxynitride of one or more of Ti, Zr and Hf, the further layer having a thickness of from about 1 to 15 µm. A friction-reducing layer, including one or more of γ-$Al_2O_3$, κ-$Al_2O_3$ and nanocrystalline Ti(C,N) and having a thickness of from about 1 to about 5 µm, can be adjacent to the further layer.

U.S. Pat. No. 6,183,846 discloses a coated cutting tool including a hard coating on a surface of a base material of cemented carbide or cermet. The hard coating includes an inner layer on the base material, an intermediate layer on the inner layer and an outer layer on the intermediate layer. The inner layer with a thickness of 0.1 to 5 µm consists of a carbide, a nitride, a carbonitride, a carbooxide, a carbo-oxynitride or a boronitride of Ti. The intermediate layer consists of $Al_2O_3$ with a thickness of 5 to 50 µm or $ZrO_2$ with a thickness of 0.5 to 20 µm. The outer layer with a thickness of 5 to 100 µm consists of a carbide, a nitride, a carbonitride, a carbo-oxide, a carbo-oxynitride or a boronitride of Ti.

Cemented carbide, in particular coated cemented carbide, is by far the most commonly used cutting tool material. Other materials include cermets, ceramics, cBN and diamond. Ceramics are often used in applications requiring high productivity such as the machining of brake discs and other components in the car industry because cemented carbide can not withstand the high temperature generated during the high speed operations required to obtain the desired high productivity. However, ceramic tools are expensive because of the high manufacturing cost. It is therefore a desire, if possible, to be able to replace ceramic tools with cemented carbide tools.

OBJECTS AND SUMMARY OF THE INVENTION

It is therefore an object of the present invention to provide cemented carbide cutting tools with the performance as ceramic cutting tools in high speed operations.

It has now been surprisingly found that coated cutting insert consisting of a substrate with high hardness and an unconventional thick coating can be used in high speed machining with essentially the same or better performance as ceramic cutting tool inserts.

In one aspect of the invention, there is provided a method of machining a metal work piece with a coated cutting tool insert, said insert comprising a cemented carbide body and a coating deposited as monolayer, multiple and/or alternating layers wherein the coating has a thickness of from about 25 to about 75 µm and the machining is performed at a cutting speed of greater than about 600 m/min.

In another aspect of the invention, there is provided a coated cemented carbide insert comprising a cemented carbide body and a coating comprising monolayers and/or multiple and/or alternating layers wherein said coating having a total thickness of from about 25 to about 75 µm and comprising;

a first layer adjacent the cemented carbide body, the first layer including a carbide, nitride, carbonitride or carboxynitride of one or more of Ti, Zr and Hf or mixtures thereof with a thickness of from about 3 to about 30 µm, an a-alumina layer adjacent said first layer with a thickness of from about 3 to about 40 µm a further layer adjacent the alumina layer, the further layer including a carbide, carbonitride or carboxynitride of one or more of the metals Ti, Zr and Hf or mixtures thereof with a thickness of from about 3 to about 30 µm and a further α-alumina layer adjacent said further layer with a thickness of from about 3 to about 40 µm and in that the cemented carbide body has a binder phase content of less than or equal to about 6.5 wt-%.

BRIEF DESCRIPTION OF THE FIGURES

In FIGS. 1-2

Figure 1:
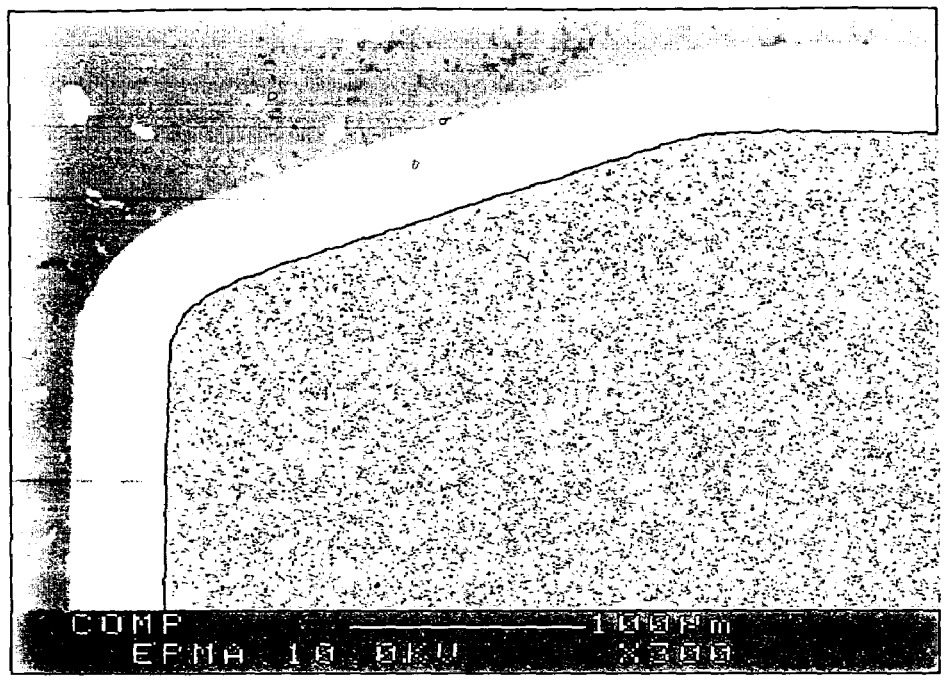
FIG. 1 shows an edge of an insert in cross section provided with a coating according to the present invention.
Figure 2:
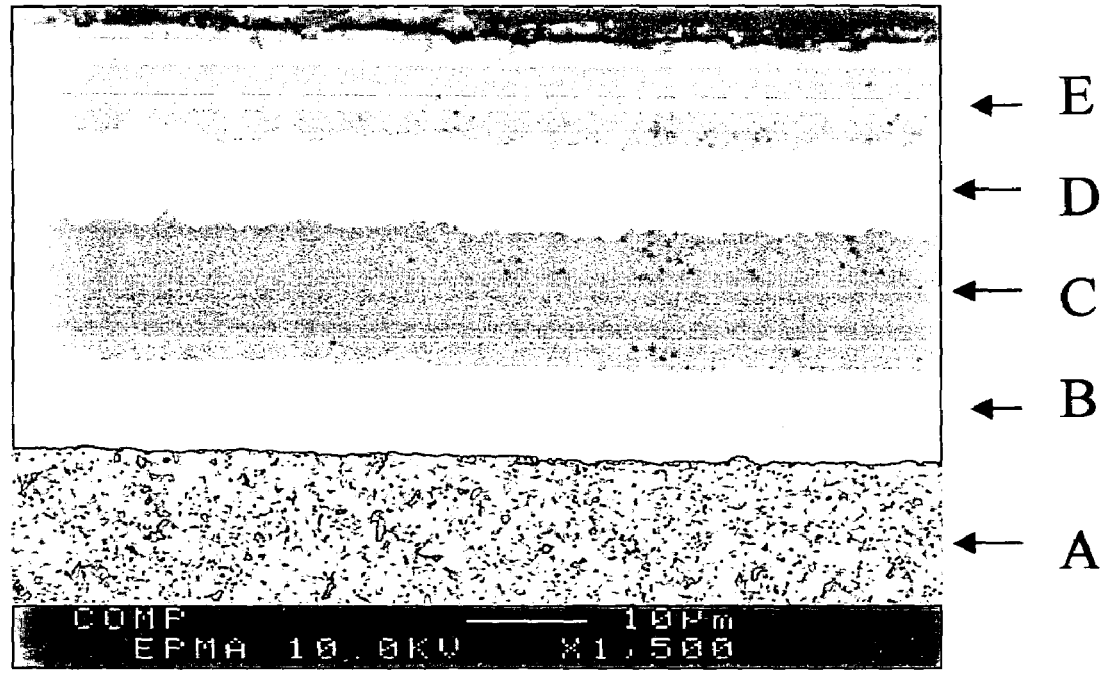
FIG. 2 shows in greater magnification the coating according to the present invention.

A—cemented carbide substrate
B—Ti(C,N)-layer including bonding and transition layers
C—$Al_2O_3$-layer
D—Ti(C,N)-layer including bonding and transition layers
E—$Al_2O_3$-layer

DETAILED DESCRIPTION OF THE PREFERRED EMBODIMENTS OF THE INVENTION

According to the method of the invention, machining a metal work piece is performed using a coated cutting tool insert comprising a cemented carbide body and a coating deposited as monolayer or as multiple and/or alternating layers. The coating has a thickness of from about 25 to about 75 µm and the machining is performed at a cutting speed of greater than about 600 m/min, preferably from about 800 to about 1500 m/min, at a cutting depth of from about 2 to about 4 mm and a feed of from about 0.3 to about 0.7 mm/rev. Preferably the cemented carbide body has a hardness of greater than about 1600 HV3, preferably greater than about 1700 HV3, most preferably greater than about 1750 HV3.

In a preferred embodiment, the coating comprises at least one layer of a carbide, nitride, carbonitride or carboxynitride of one or more of Ti, Zr and Hf or mixtures thereof and at least one layer of alumina, preferably alpha-alumina.

In a further preferred embodiment, the coating comprises a first layer adjacent the cemented carbide body, the first layer including a carbide, nitride, carbonitride or carboxynitride of one or more of Ti, Zr and Hf or mixtures thereof an alumina layer adjacent said first layer a further layer adjacent the alumina layer, the further layer including a carbide, carbonitride or carboxynitride of one or more of Ti, Zr and Hf and a further alumina layer adjacent said further layer.

The method is particularly useful for the machining of grey cast iron.

The present invention also relates to a coated cutting tool insert particularly useful for the machining at high cutting speed, greater than about 600 m/min comprising a cemented carbide body and a coating. The coating comprises four layers. Each layer is deposited as single monolayer and/or multiple layers including alternating sublayers including transition layers and/or layers promoting adhesion and/or phase control of a subsequently deposited layer. The coating has a total thickness of from about 25 to about 75 µm and comprises:

a first layer adjacent the cemented carbide body, the first layer including a carbide, nitride, carbonitride or carboxynitride of one or more of Ti, Zr and Hf or mixtures thereof with a thickness of from about 3 to about 30 µm, preferably from about 4 to about 15 µm, an α-alumina layer adjacent said first layer with a thickness of from about 3 to about 40 µm, preferably from about 4 to about 20 µm a further layer adjacent the alumina layer, the further layer including a carbide, nitride, carbonitride or carboxynitride of one or more of the metals Ti, Zr and Hf or mixtures or multilayers thereof with a thickness of from about 3 to about 30 µm, preferably from about 4 to about 15 µm and a further α-alumina layer adjacent said further layer with a thickness of from about 3 to about 40 µm, preferably from about 4 to about 20 µm and in that the cemented carbide body has a binder phase content of less than or equal to about 6.5 wt-%, preferably less than or equal to about 5 wt-%.

In one preferred embodiment, the difference in thickness between the first layer and the further layer is less than about 20% and the difference in thickness between the alumina layer and the further alumina layer less than about 20%.

In another preferred embodiment, the difference in thickness between the first layer and the further layer is less than about 20% and the thickness of the further alumina layer is from about 20 to about 60% of the alumina layer.

Preferably, the first layer and/or the further layer comprises of Ti(C,N) with columnar structure.

All thickness values include thin conventional transition and bonding layers such as TiN, Ti(C,N), Ti(C,O), Ti(C,N,O) and Ti(N,O). The thickness of these individual bonding or transition layers is between about 0.1 and about 2 µm.

In another embodiment one or more further layers are applied on top of the coating such as a thin TiN-layer, a friction reducing layer such as sulphides of tungsten and/or molybdenum, or one or more alternating Ti(C,N)- and $Al_2O_3$-layers. In case of an outermost thin TiN layer it can be mechanically removed by known technique from the rake face. In such case the outermost layer on the rake face is $Al_2O_3$ and on the clearance face TiN.

The substrate contains less than or equal to about 6.5 wt-%, preferably less than or equal to about 5 wt-% binder phase and from about 0 to about 10 wt-% TiC, TaC and/or NbC and/or from about 0.2 to about 0.6 wt-% $Cr_2C_3$ and as rest WC with an average grain size of from about 0.3 to about 2 µm, preferably from about 0.5 to about 1.5 µm.

The geometry of the inserts according to the invention is that used for machining of short chipping materials, i.e., inserts with a flat rake face, without chip breakers, or with simple chip breakers. Preferably, the inserts have a rake face-land with a width of from about 100 to about 300 µm and with an angle of from about 10 to about 25 degrees to the rake face and with an edge rounding of from about 20 to about 50 um.

The coating is deposited using conventional CVD or MT-CVD to about techniques known in the art.

The invention is additionally illustrated in connection with the following examples, which are to be considered as illustrative of the present invention. It should be understood, however, that the invention is not limited to the specific details of the examples.

EXAMPLE 1

Cemented carbide substrates A-D with compositions according to table 1 were produced in the conventional way from powders, which were milled, pressed and sintered with or without grounding to insert shapes, ISO standard CNMA120416 T02020 and CNMA120416-KR. Furthermore the inserts were subjected to mechanical edge rounding.

After that the inserts were cleaned and coated using processes known in the art. Coating compositions and thicknesses appear from Table 2.

Two major types of layers Ti(C,N) and α-$Al_2O_3$ were deposited. Ti(C,N) was deposited so that a columnar grain structure of the layer was obtained. This was done by using the known MT-CVD process (MT-medium temperature, CVD-chemical vapor deposition) where besides other gases acetonitrile, $CH_3CN$, was used as nitrogen and carbon source.

In the start of the coating process, at the transition zone between Ti(C,N) and $Al_2O_3$ layers and at the end of the coating process conventional processes were also used. These conventional processes resulted in the formation of <2 µm thick transition or bonding layers of TiN, Ti(C,O) and/or Ti(C,N,O).

The outermost coating can be $Al_2O_3$ or thin TiN layer. This TiN layer can be mechanically removed by known technique from the rake face of the insert. In that case the outermost layer on the rake face was $Al_2O_3$ and on flank side TiN.

TABLE 1

Composition of Cemented Carbide Substrates in wt-%

| Substrate | Co | TaC | NbC | TiC | $Cr_3C_2$ | WC | Hardness HV3 |
|---|---|---|---|---|---|---|---|
| A | 3.7 | 1.5 | 0.5 | — | — | balance | 1840 |
| B | 5.2 | — | — | — | 0.5 | balance | 1775 |
| C | 5.9 | 0.6 | 0.4 | 7.7 | — | balance | 1850 |
| D | 6.0 | — | — | — | — | balance | 1620 |

TABLE 2

Composition and thickness of the layers.

| Coating no | *Ti(C, N), μm | Al2O3, μm | Ti(C, N), μm | Al₂O₃, μm | Ti(C, N), μm | Al₂O₃, μm | **Total thickness, μm |
|---|---|---|---|---|---|---|---|
| 1 invention | 7.5 | 11.1 | 7.6 | 9.0 | — | — | 35, 2 |
| 2 invention | 8.0 | 10.2 | 7.5 | 3.5 | — | — | 29, 2 |
| 3 invention | 8.8 | 12.4 | 8.5 | 12.2 | 8.0 | 12.6 | 62.5 |
| 4 prior art | 7.2 | 10.1 | — | — | — | — | 17.3 |
| 5 prior art | 8.5 | 4.5 | — | — | — | — | 13.0 |
| 6 | 15.3 | 15.5 | | | | | 30.8 |

*layer closest to the cemented carbide substrate,
**total coating thickness including bonding and transition layers.
Ti(C, N) layers thickness includes also thickness of bonding and transition layers

EXAMPLE 2

Inserts of style CNMA120416 T02020 with an edge radius of 30 um (as measured on the uncoated insert) with substrates A, B and C with coating 1 or 2 or 6 designated A/1, B/2, B/6 and C/2, respectively and B/4 and D/5 were subjected to a high-speed cutting test in brake discs of a grey cast iron. The discs had a diameter of 139 mm, comprising small plane surfaces oriented at different angles towards the body axis. The flank wear width of the cutting edge after 150 discs was measured. As references were inserts B/4 and commercially available Si₃N₄ ceramic insert with the same geometry used.

Machining Data

| | |
|---|---|
| Work piece: | SS0120, grey cast iron. |
| Type of operation: | continuous internal turning operation. |
| Cutting speed: | varying from 500 to 1000 m/min, mostly over 900 m/min |
| Depth of cut: | 2-4 mm. |
| Feed: | 0.5 mm/rev. |
| Coolant: | dry operation. |
| Cutting time: | per piece total up to 10 sec, comprising single cuts of various time lengths. |

RESULTS:

| Insert | Flank wear, mm |
|---|---|
| A/1 invention | 0.17 |
| B/2 invention | 0.18 |
| C/2 invention | 0.20 |
| B/6 invention | 0.21 |
| B/4 prior art | 0.60 |
| D/5 prior art | 0.97 |
| Si₃N₄ ceramic insert | 0.20 |

EXAMPLE 3

Example 2 was repeated with inserts A/1, D/1, A/2, B/2, A/3, B/6, B/4 and C/5 with brake discs of diameter 177 mm. The number of machined discs until the inserts were worn out was determined.

Cutting Data

| | |
|---|---|
| Work piece: | SS0120, grey cast iron. |
| Type of operation: | continuous internal turning operation. |
| Cutting speed: | varying from 600 to 1200 m/min, mostly over 1000 m/min) |
| Depth of cut: | 2-4 mm. |
| Feed: | 0.5 mm/rev. |
| Coolant: | dry operation. |
| Cutting time: | per piece total up to 10 sec, comprising single cuts of various time lengths. |

RESULTS:

| Insert | Number of discs |
|---|---|
| A/1 invention | 233 |
| D/1 invention | 177 |
| A/2 invention | 203 |
| B/2 invention | 191 |
| A/3 invention | 240 |
| B/6 invention | 201 |
| B/4 prior art | 80 |
| C/5 prior art | 55 |
| Si₃N₄ ceramic/Reference | 217 |

EXAMPLE 4

Example 2 was repeated with inserts A/1, A/2, A/4, A/6, B/2, B/4 and with a work piece consisting of a package of five grey cast iron discs mounted adjacent to each other on the same axis. The single disc thickness was 16.5 mm and the disc diameter was about 245 mm. The longitudinal turning operation was performed so that the cutting speed was kept constant at 1000 m/min. The total number of passes through the five discs was determined until the inserts were worn out, VB>0.5 mm, or edge fracture occurred.

Cutting Data

| | |
|---|---|
| Work piece: | SS0125, grey cast iron. |
| Type of operation: | continuous turning with some intermittence |
| Cutting speed: | 1000 m/min |
| Depth of cut: | 2 mm. |
| Feed: | 0.5 mm/rev. |
| Coolant: | dry operation. |

RESULTS:

| Insert | Number of passes |
|---|---|
| A/1 method according to the invention | 25 |
| A/2 method according to the invention | 23 |
| B/2 method according to the invention | 20 |
| B/4 method according to the prior art | 12 |
| A/4 method according to the prior art | 4 |
| A/6 method according to the invention | 18 |
| Si₃N₄ ceramic/Reference | 21 |

The invention claimed is:

1. A coated cemented carbide insert comprising a cemented carbide body and a coating comprising monolayers and/or multiple and/or alternating layers,
    wherein said coating has a total thickness of from about 25 to about 75 μm and comprises:
    a first layer adjacent the cemented carbide body, the first layer including a carbide, nitride, carbonitride or carboxynitride of one or more of Ti, Zr and Hf or mixtures thereof with a thickness of from about 3 to about 30 μm,
    an α-alumina layer adjacent said first layer with a thickness of from about 3 to about 40 μm,
    a further layer adjacent the alumina layer, the further layer including a carbide, carbonitride or carboxynitride of one or more of the metals Ti, Zr and Hf or mixtures thereof with a thickness of from about 3 to about 30 μm, and
    a further α-alumina layer adjacent said further layer with a thickness of from about 3 to about 40 μm, and
    wherein the cemented carbide body has a binder phase content of less than or equal to about 6.5 wt-%.

2. An insert of claim 1 wherein the difference in thickness between the first layer and the further layer is less than about 20% and the difference in thickness between the alumina layer and the further alumina layer is less than about 20%.

3. An insert of claim 1 wherein the difference in thickness between the first layer and the further layer is less than about 20% and the thickness of the further alumina layer is from about 20 to about 60% of the alumina layer.

4. An insert of claim 1 that the first layer and/or the further layer comprise Ti(C,N) with columnar structure.

5. An insert of claim 1 wherein the thickness of the first layer is from about 4 about 15 μm, the thickness of the α-alumina layer adjacent the first layer is from about 4 to about 20 μm, the thickness of the further layer is from about 4 to about 15 μm, the thickness of the further α-alumina layer is from about 9 to about 20 μm and the cemented carbide body has a binder phase of less than or equal to about 5 wt-%.

* * * * *